United States Patent
Huff

(10) Patent No.: US 9,757,668 B2
(45) Date of Patent: *Sep. 12, 2017

(54) FILTER TURNING MECHANISM

(71) Applicant: HB Spider, LLC, Joplin, MO (US)

(72) Inventor: Christopher M. Huff, Reeds, MO (US)

(73) Assignee: HB Spider LLC, Joplin, MO (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/514,489

(22) Filed: Oct. 15, 2014

(65) Prior Publication Data

US 2015/0027741 A1    Jan. 29, 2015

Related U.S. Application Data

(63) Continuation of application No. 13/307,717, filed on Nov. 30, 2011, now Pat. No. 8,968,564.

(51) Int. Cl.
| | | |
|---|---|---|
| *B25B 13/00* | (2006.01) | |
| *B01D 35/30* | (2006.01) | |
| *B01D 29/96* | (2006.01) | |
| *B25B 13/48* | (2006.01) | |
| *B25B 17/00* | (2006.01) | |
| *B25B 23/14* | (2006.01) | |

(52) U.S. Cl.
CPC .......... *B01D 29/96* (2013.01); *B01D 35/306* (2013.01); *B25B 13/48* (2013.01); *B25B 17/00* (2013.01); *B25B 23/141* (2013.01)

(58) Field of Classification Search
CPC ... B25B 23/14; B25B 23/142; B25B 27/0042; B25B 13/46; B01D 2201/24; B01D 27/08; B01D 35/306; Y01S 210/17; B67B 7/18; F01M 11/03

USPC .......... 210/232, 416.4, 416.5, 541, DIG. 17; 81/3.35, 52, 467, 473, 476, 447, 443, 81/456, 90.2

See application file for complete search history.

(56) References Cited

U.S. PATENT DOCUMENTS

| | | |
|---|---|---|
| 348,185 A | 8/1886 | Bowman |
| 2,968,203 A | 6/1959 | Crafford |
| 3,066,559 A | 3/1961 | Harvel et al. |
| 3,240,086 A | 3/1966 | Way |
| 3,853,026 A | 12/1974 | Rhodes |
| 3,944,102 A | 3/1976 | Grau |
| 4,103,872 A | 8/1978 | Hirasuka |
| 4,114,481 A | 9/1978 | Kowalczyk |
| 4,371,439 A | 2/1983 | Thornton |
| 4,643,053 A | 2/1987 | Rhodes |
| 4,854,277 A | 8/1989 | Kenney |

(Continued)

*Primary Examiner* — Claire Norris

(74) *Attorney, Agent, or Firm* — Martin & Associates, LLC; Derek P. Martin

(57) ABSTRACT

A filter turning mechanism is attached to an engine in proximity to a filter (such as an oil filter), and may be used to install or remove a filter by turning the filter. The filter turning mechanism contacts a filter, and rotates the filter when the filter turning mechanism is rotated with a tool. One implementation of the filter turning mechanism includes an inner drive gear and a filter drive mechanism. The inner drive gear normally spins freely within the filter drive mechanism, but when pushed into the filter drive mechanism with a suitable tool such as a ratchet extension, the inner drive gear engages the filter drive mechanism, thereby causing rotation of the inner drive gear to rotate the filter drive mechanism as well, which in turn rotates the filter.

13 Claims, 19 Drawing Sheets

(56) References Cited

U.S. PATENT DOCUMENTS

| | | |
|---|---|---|
| D309,974 S | 8/1990 | Tannous |
| 5,154,102 A | 10/1992 | Becker |
| 5,207,131 A | 5/1993 | Pool et al. |
| 5,323,671 A | 6/1994 | Hebert |
| 5,469,935 A | 11/1995 | Hewuse |
| 5,857,503 A | 1/1999 | Vreeken |
| 6,375,840 B1 | 4/2002 | Hunter |
| 6,401,574 B1 | 6/2002 | Myers |
| D460,146 S | 7/2002 | Setser |
| 2004/0025824 A1 | 2/2004 | MichelfelDer |
| 2006/0081526 A1 | 4/2006 | Sanders |
| 2008/0047398 A1 | 2/2008 | Buchanan |

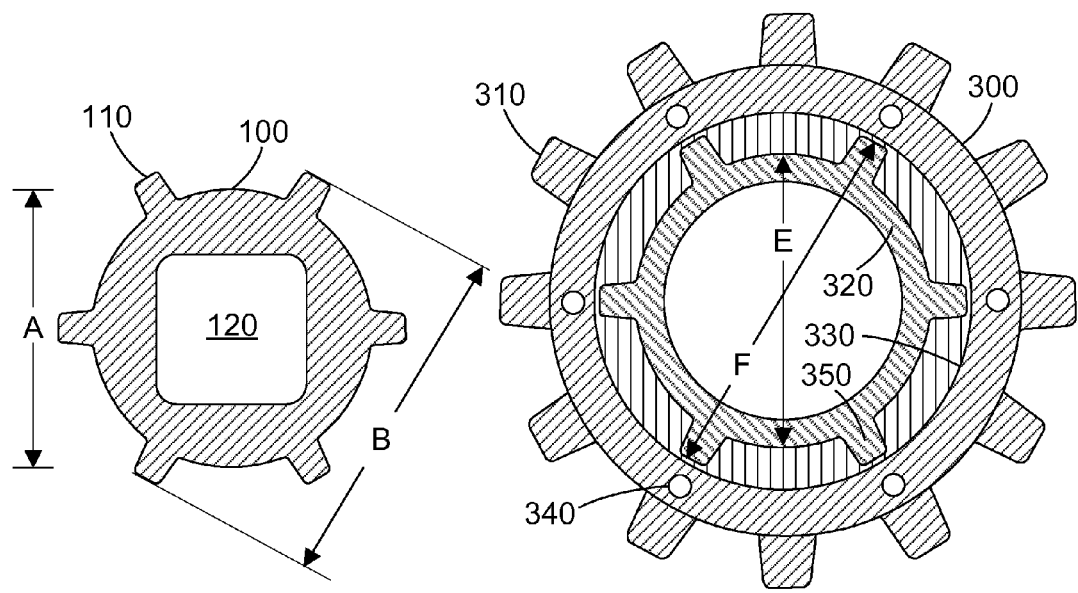
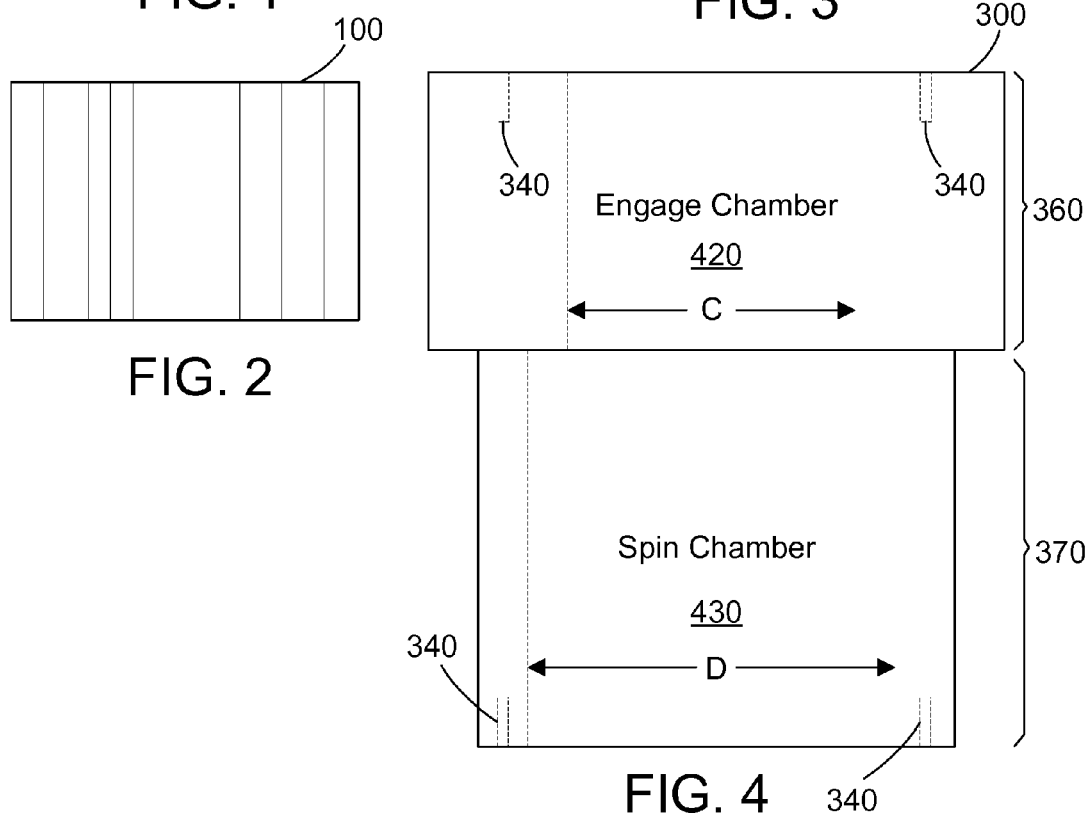

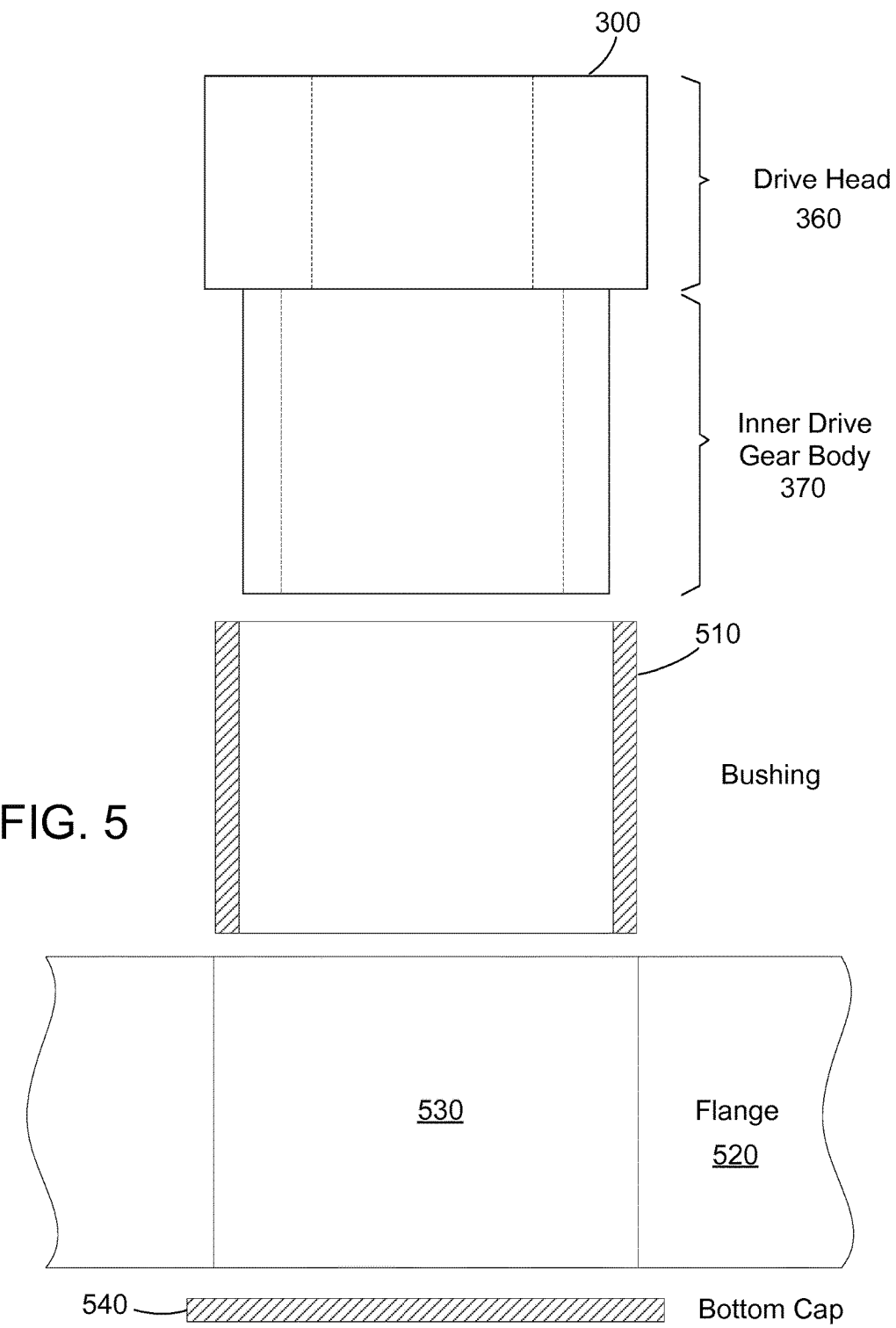

FILTER TURNING MECHANISM

BACKGROUND

1. Technical Field

This disclosure generally relates to filters for engines, and more specifically relates to a mechanism for turning filters.

2. Background Art

Filters are needed to remove impurities from liquids in an internal combustion engine. Oil filters, hydraulic fluid filters, transmission fluid filters, and fuel filters are examples of known filters on internal combustion engines. Metal can-type filters are inexpensive and disposable, and are installed by turning the filter on a threaded post until a gasket on the filter is tightened against a receiving filter flange. When the filter needs to be replaced, the filter is turned in the opposite direction until the filter is free from the threaded post. A new filter may then be placed on the threaded post and installed by turning the filter.

Sometimes installing and removing filters can be difficult. For example, the placement of the filter in the engine compartment may make it difficult to get a tool or wrench on the filter to break it loose. Once broken loose, a filter may generally be turned by hand, but it typically takes a tool to apply sufficient force to get the filter to break loose (i.e., start turning). To address this problem, many different tools have been developed to assist in removing filters. However, each of these tools requires space in the engine compartment to place the tool on the filter, and some require significant space that may not be available, rendering such tools useless. In addition, some filters, such as those installed on heavy equipment such as bulldozers and backhoes, must be tightened with a tool to assure that vibration does not loosen the filters. In the prior art, a mechanic must inspect a filter on an engine, determine which tool is best suited to removing the filter, locate the tool, then use the tool to remove the old filter. The tool may also be used to install the new filter.

BRIEF SUMMARY

A filter turning mechanism is attached to an engine in proximity to a filter (such as an oil filter), and may be used to install or remove a filter by turning the filter. The filter turning mechanism contacts a filter, and rotates the filter when the filter turning mechanism is rotated with a tool. One implementation of the filter turning mechanism includes an inner drive gear and a filter drive mechanism. The inner drive gear normally spins freely within the filter drive mechanism, but when pushed into the filter drive mechanism with a suitable tool such as a ratchet extension, the inner drive gear engages the filter drive mechanism, thereby causing rotation of the inner drive gear to rotate the filter drive mechanism as well. The filter drive mechanism is in contact with an outer case of the filter, causing the filter to rotate with the rotation of the filter drive mechanism. The filter turning mechanism may thus be used to turn a filter onto a threaded filter mount until tight, and may also be used to turn a filter off the threaded filter mount.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a top view of an inner drive gear;

FIG. 2 is a side view of the inner drive gear shown in FIG. 1;

FIG. 3 is a top view of a filter drive mechanism for a first implementation of the filter turning mechanism that allows using a tool from the bottom of the filter turning mechanism;

FIG. 4 is side view of the filter drive mechanism shown in FIG. 3;

FIG. 5 is an exploded cross-sectional view showing some of the components in the filter turning mechanism;

DETAILED DESCRIPTION

Figure 6:
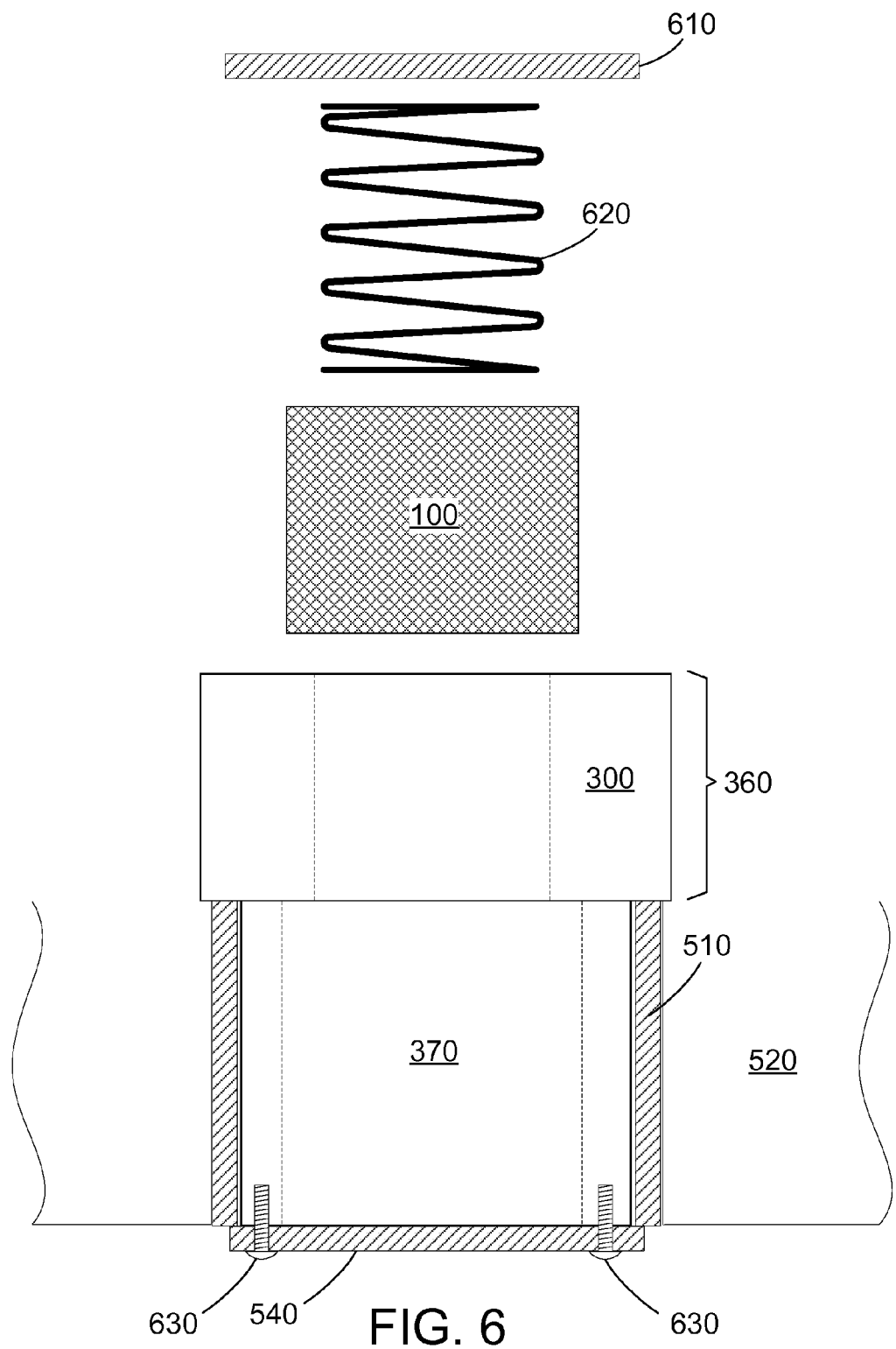
FIG. 6 is a cross-sectional view of the filter turning mechanism partially assembled and partially exploded.

A filter turning mechanism is attached to an engine in proximity to a filter, and may be used to install a filter by turning the filter on, and may be used to remove a filter by turning the filter off. One implementation of the filter turning mechanism includes an inner drive gear disposed within a filter drive mechanism. A spring normally keeps the inner drive gear in a spin chamber of the filter drive mechanism, allowing the inner drive gear to spin freely without engaging the filter drive mechanism. A tool such as a socket extension may be used to push the inner drive gear to overcome the bias of the spring so the inner drive gear engages the filter drive mechanism. At this point, rotating the inner drive gear causes corresponding rotation of the filter drive mechanism, which contacts and rotates the filter.

Referring to FIG. 1, one specific configuration of an inner drive gear 100 is shown, and includes multiple gear teeth 110 and a substantially square hole 120 that extends through the inner drive gear 100 Inner drive gear has an inner diameter A shown in FIG. 1 exclusive of the gear teeth 110, and a larger diameter B shown in FIG. 1 inclusive of the gear teeth 110. FIG. 2 shows a side view of the inner drive gear 100 in FIG. 1.

One specific implementation of the filter drive mechanism is shown in FIG. 3. A filter drive mechanism 300 includes external gear teeth 310, multiple holes 340, a shaped portion 350 for receiving the inner drive gear 100 shown in FIG. 1, and a cylindrical portion 330 that makes up the walls of the spin chamber 430 shown in FIG. 4. The interior of the filter drive mechanism 300 includes an engage chamber 420 that includes the shaped portion 350 for receiving the inner drive gear 100 shown in FIG. 1. The spin chamber 430 includes the cylindrical portion 330 that defines spin chamber 430. The spin chamber 430 has a diameter D that is greater than the diameter B shown in FIG. 1, thereby allowing the inner drive gear to spin freely in the spin chamber 430. The shaped portion 350 in the engage chamber 420 has an inner dimension E shown in FIGS. 3 and 4 that is greater than diameter A and less than diameter B shown in FIG. 1, and has an outer dimension F that is greater than diameter B shown in FIG. 1. This allows the inner drive gear 100 shown in FIG. 1 to slide through the engage chamber 420 into the spin chamber 430. The inner drive gear 100 may then by pushed and turned by a suitable tool so the inner drive gear enters the engage chamber 420, which causes turning of the inner drive gear to also turn the filter drive mechanism. The operation of the filter turning mechanism is discussed in more detail below.

FIG. 5 illustrates components for a first implementation of the filter turning mechanism that are installed into a filter flange 520 that includes a hole 530 in proximity to a filter. Flange 520 may include an existing filter flange in an engine, or may include an assembly discussed below with reference to FIGS. 19-23. The filter drive mechanism 300 includes a drive head 360 that contacts the filter and an inner drive gear body 370. A bushing 510 and bottom cap 540 are also shown. The bushing 510 is preferably a cylindrical brass bushing, but may be made of any suitable material. The bushing 510 is pressed into the hole 530 in flange 520, as shown in FIG. 6. The bushing 510 preferably has an interference fit with hole 530 so that once pressed into the hole 530 the bushing 510 will not move. Once the bushing 510 is installed, the inner drive gear body 370 of the filter drive mechanism 300 is placed inside the bushing, as shown in FIG. 6. The bushing 510 has a height that is slightly greater than the height of flange 520. In addition, the height of the inner drive gear body 370 is slightly greater than the height of the bushing. This makes it so the filter drive mechanism 300 may rotate freely after being installed within the flange 520. Once the filter drive mechanism 300 is placed within the bushing 510 as shown in FIG. 6, the bottom cap 540 is screwed to the bottom of the filter drive mechanism 300 as shown using multiple screws 630. Note the bottom cap 540 is slightly wider than the inner diameter of the bushing, thereby captivating the filter drive mechanism 300 within the bushing 510, which is captivated within the flange 520. Because the length of the inner drive gear body 350 of the filter drive mechanism 300 is slightly longer than the length of the bushing 510, once the bottom cap is screwed onto the filter driver gear 300, the filter drive mechanism will rotate freely within flange 520.

Figure 7:
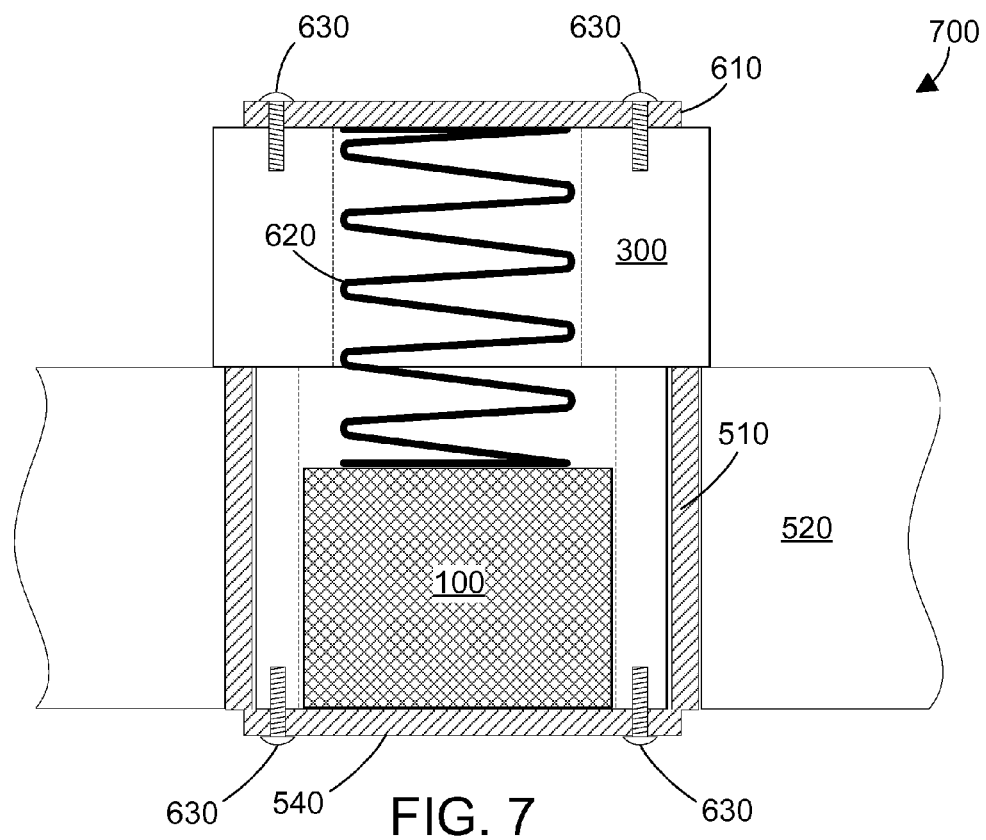
FIG. 7 is a cross-sectional view of the assembled first implementation of the filter turning mechanism.

FIG. 6 also shows other pieces in the assembly, including the inner drive gear 100, a spring 620, and a top cap 610. The inner drive gear 100 is shaped and dimensioned to slide through engage chamber 420 in the drive head 360 of the filter drive mechanism 300 and drop into the spin chamber 430 in the inner drive gear body 370 of the filter drive mechanism 300, as shown in FIG. 7. The spring 620 is then placed on top of the inner drive gear 100, and the top cap 610 is secured using screws 630. The assembled filter turning mechanism 700 is now ready for use.

Figure 8:
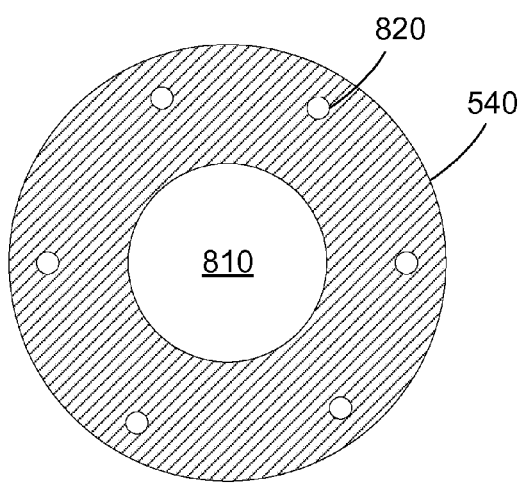
FIG. 8 is a top view of the bottom cap shown in FIGS. 5-7.

FIG. 8 shows one suitable configuration for the bottom cap 540 that includes a large center hole 810 and multiple smaller holes 820 for attaching the bottom cap 540 to the bottom of the filter drive mechanism 300 with screws. The large hole 810 is dimensioned to allow a suitable tool to pass through the bottom cap 540 to contact the inner drive gear 100. In the examples provided herein, the tool shown in the figures is a ratchet extension, so the hole 810 is dimensioned to allow a suitable ratchet extension to pass through. The top cap 610 may be identical to the bottom cap 540, or could have a different configuration. For example, because the ratchet extension extends through the bottom cap 540 for the filter turning assembly 700 shown in FIGS. 7 and 9, the top cap 610 could be a solid plate with only screw holes 820 (i.e., without a large hole 810). This would allow the top cap 610 to keep dirt and grime from gumming up the works inside the filter turning mechanism 700.

Figure 9:
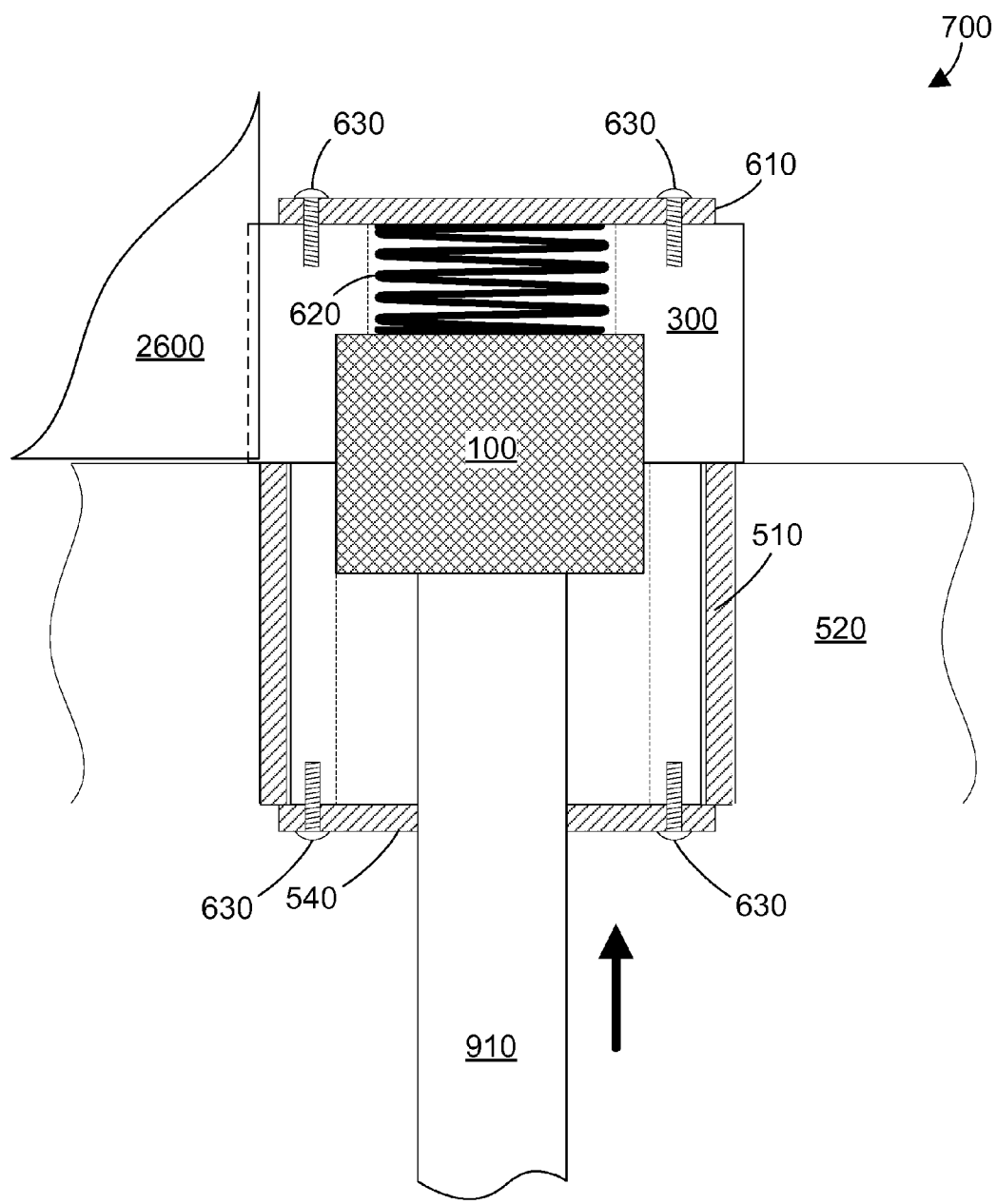
FIG. 9 is a cross-sectional view of the assembled first implementation of the filter turning mechanism illustrating how a ratchet extension can push the inner drive gear to engage the filter drive mechanism so that rotation of the ratchet extension causes rotation of the filter drive mechanism to turn a filter.

The operation of the filter turning mechanism 700 is shown in FIG. 9. When a mechanic wants to turn the filter 2600 shown in partial view in FIG. 9, the mechanic can place a ratchet extension 910 through the hole 810 in the bottom cap 540 to contact the inner drive gear 100. In this specific configuration, the substantially square hole 120 in the drive gear 100 shown in FIG. 1 receives the top of the ratchet extension in the same way a socket receives the ratchet extension. The mechanic then pushes on the ratchet extension 910 while turning. Once the gear teeth of the inner drive gear 100 align with the corresponding recesses in the drive head 360 in the engage chamber 420, the inner drive gear 100 will slide within the drive head 360, causing the inner drive gear to engage the filter drive mechanism 300. At this point, rotation of the inner drive gear 100 causes rotation of the filter drive mechanism 300. Note the ratchet extension may be turned in either direction to either turn a filter on or to turn a filter off. Once the mechanic removes the ratchet extension 910, the bias force of the spring 620 pushes the inner drive gear 100 back into the spin chamber 430.

Figure 10:
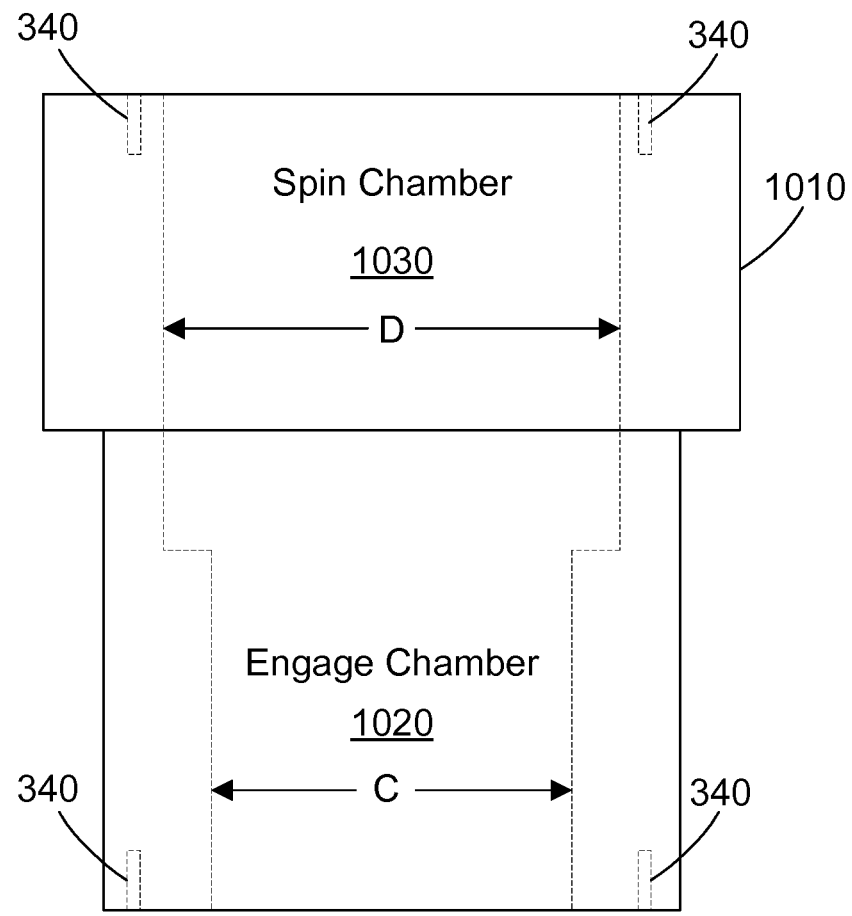
FIG. 10 is a cross-sectional view of a second implementation for the filter turning mechanism that allows using a tool from the top of the filter turning mechanism.
Figure 11:
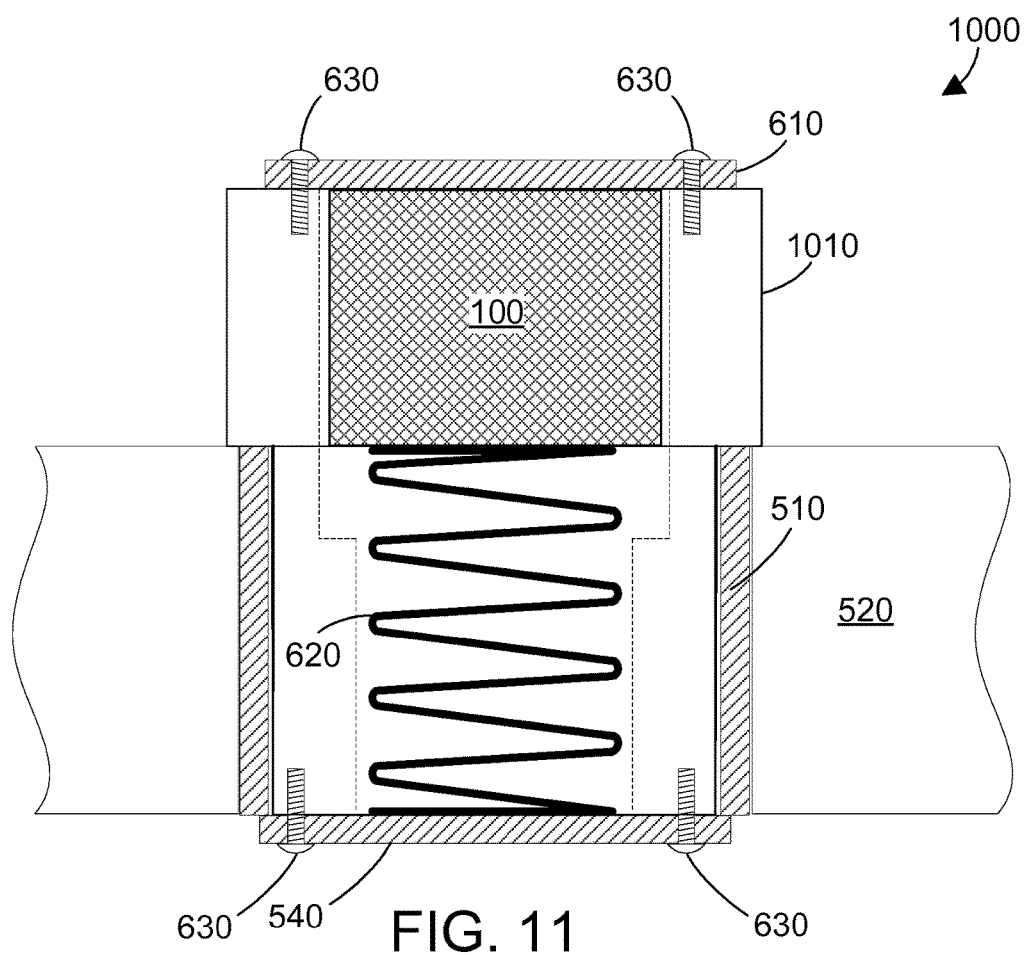
FIG. 11 is a cross-sectional view of the assembled second implementation of the filter turning mechanism.
Figure 12:
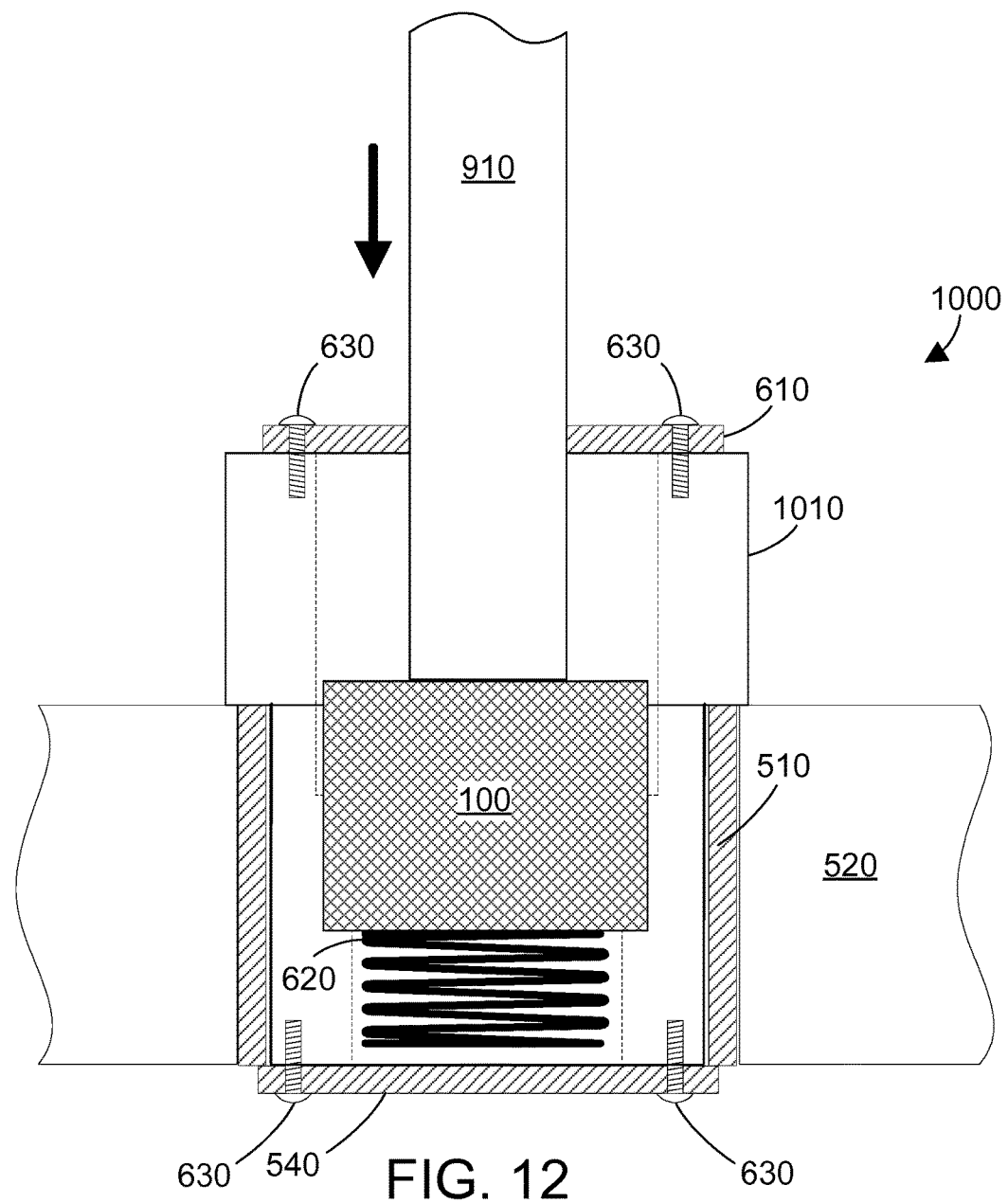
FIG. 12 is a cross-sectional view of the assembled second implementation of the filter turning mechanism illustrating how a ratchet extension can push the inner drive gear to engage the filter drive mechanism so that rotation of the ratchet extension causes rotation of the filter drive mechanism to turn a filter.

The first configuration for the filter turning mechanism shown in FIGS. 3-8 works well when the mechanic needs to turn the filter turning mechanism from the side of the flange 520 opposite the filter, as shown in FIG. 9. If the mechanic needs to turn the filter turning mechanism from the opposite side, a different structure is needed. FIGS. 10-12 illustrate a second implementation for the filter turning mechanism that allows the filter turning mechanism to be turned from the same side as the filter. This configuration would be needed, for example, in an existing car engine where an oil filter screws to a corresponding filter location on the engine block, which makes it impossible to access the filter turning mechanism from the side opposite the filter. Referring to FIG. 10, a filter drive mechanism 1010 is identical in outside configuration as the filter drive mechanism 300 shown in FIG. 4, but the inside configuration is turned upside down so the spin chamber 1030 is at the top and the engage chamber 1020 is at the bottom. With this configuration, the filter drive mechanism 1010 is installed into the bushing 510 and secured with bottom cap 540 and screws 630 the same as shown in FIG. 6. However, instead of installing the inner drive gear 100 followed by the spring 620, the spring is installed first, with the inner drive gear 100 resting on the spring 620, as shown in FIG. 11. The top cap 610 is installed with screws 630. In the configuration shown in FIG. 11, the top cap 610 will have the configuration shown in FIG. 8 with a hole 810 that retains the inner drive gear but allows a ratchet extension to pass through. Referring to FIG. 12, the assembled filter turning mechanism 1000 is used by placing a tool such as a ratchet extension 910 through the hole 810 in the top plate 610 to engage the inner drive gear 100 the same way the ratchet extension engages a socket. The ratchet extension 910 is then pushed down while rotating until the inner drive gear 100 aligns with the corresponding recesses in the engage chamber, which overcomes the bias force of the spring 620 and causes the inner drive gear 100 to slide within the engage chamber, thereby engaging the filter drive mechanism 1010, as shown in FIG. 12. The ratchet extension 910 may then be rotated in either direction to turn the filter that is contacting the filter drive mechanism 1010 as needed.

Figure 13:
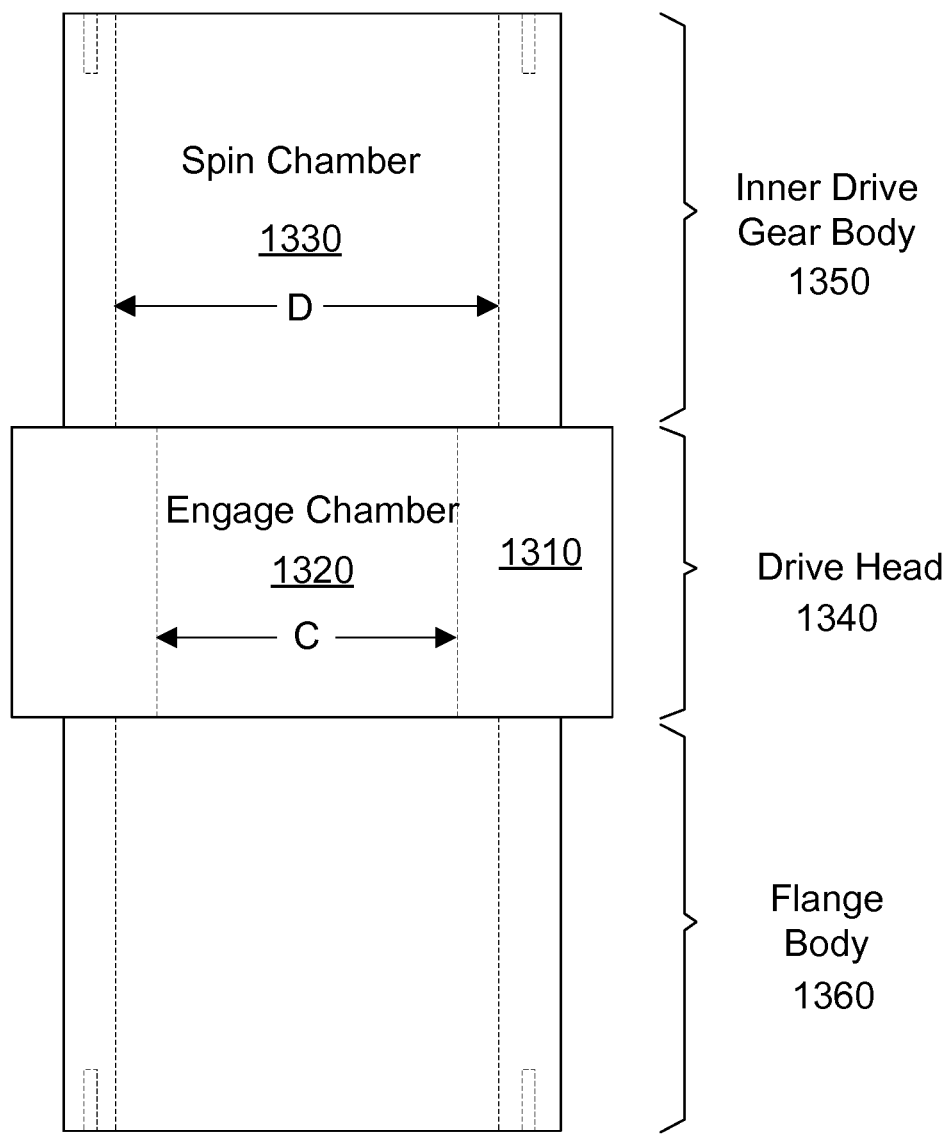
FIG. 13 is a cross-sectional view of a third implementation for the filter turning mechanism that allows using a tool from the top of the filter turning mechanism.
Figure 14:
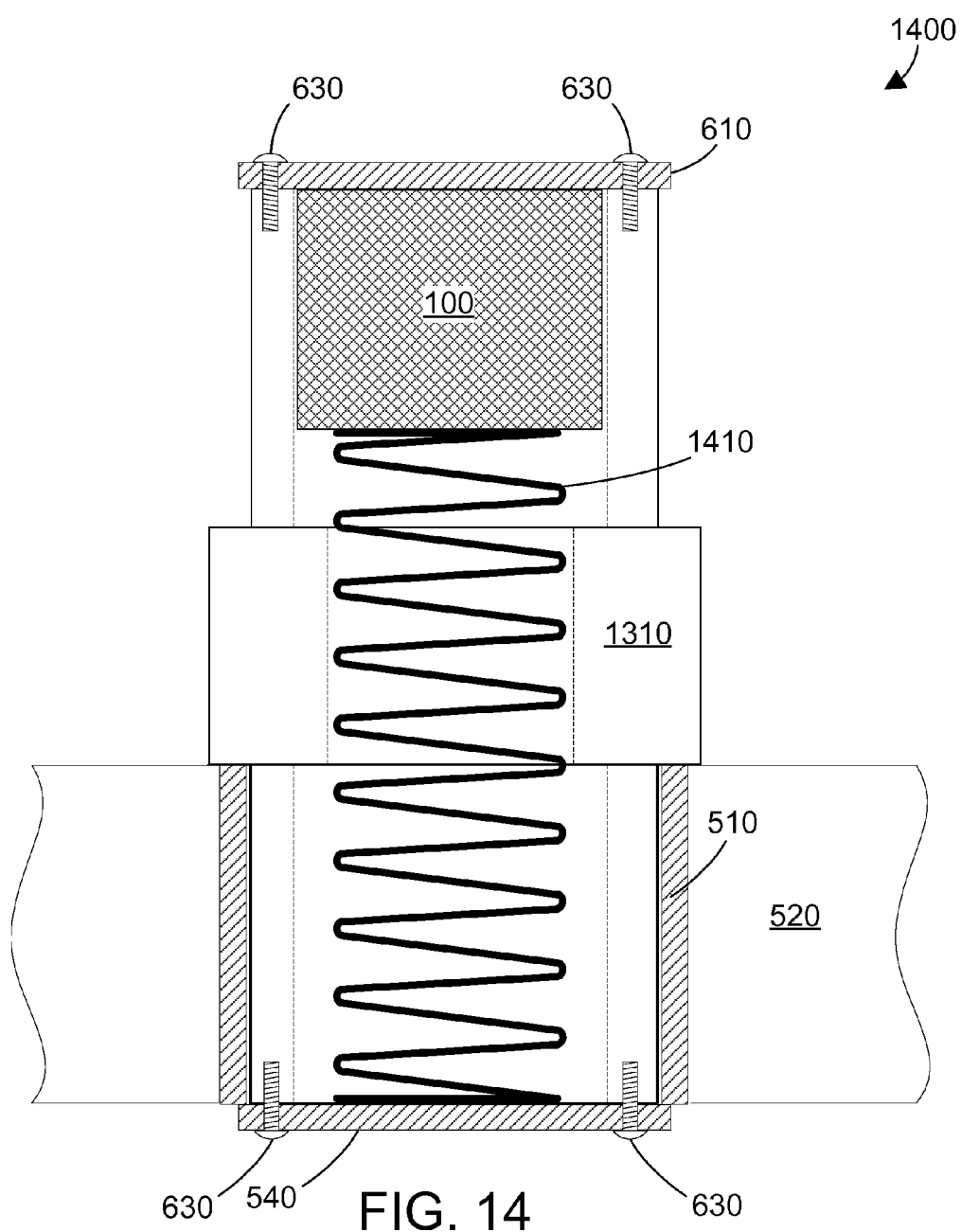
FIG. 14 is a cross-sectional view of the assembled third implementation of the filter turning mechanism.
Figure 15:
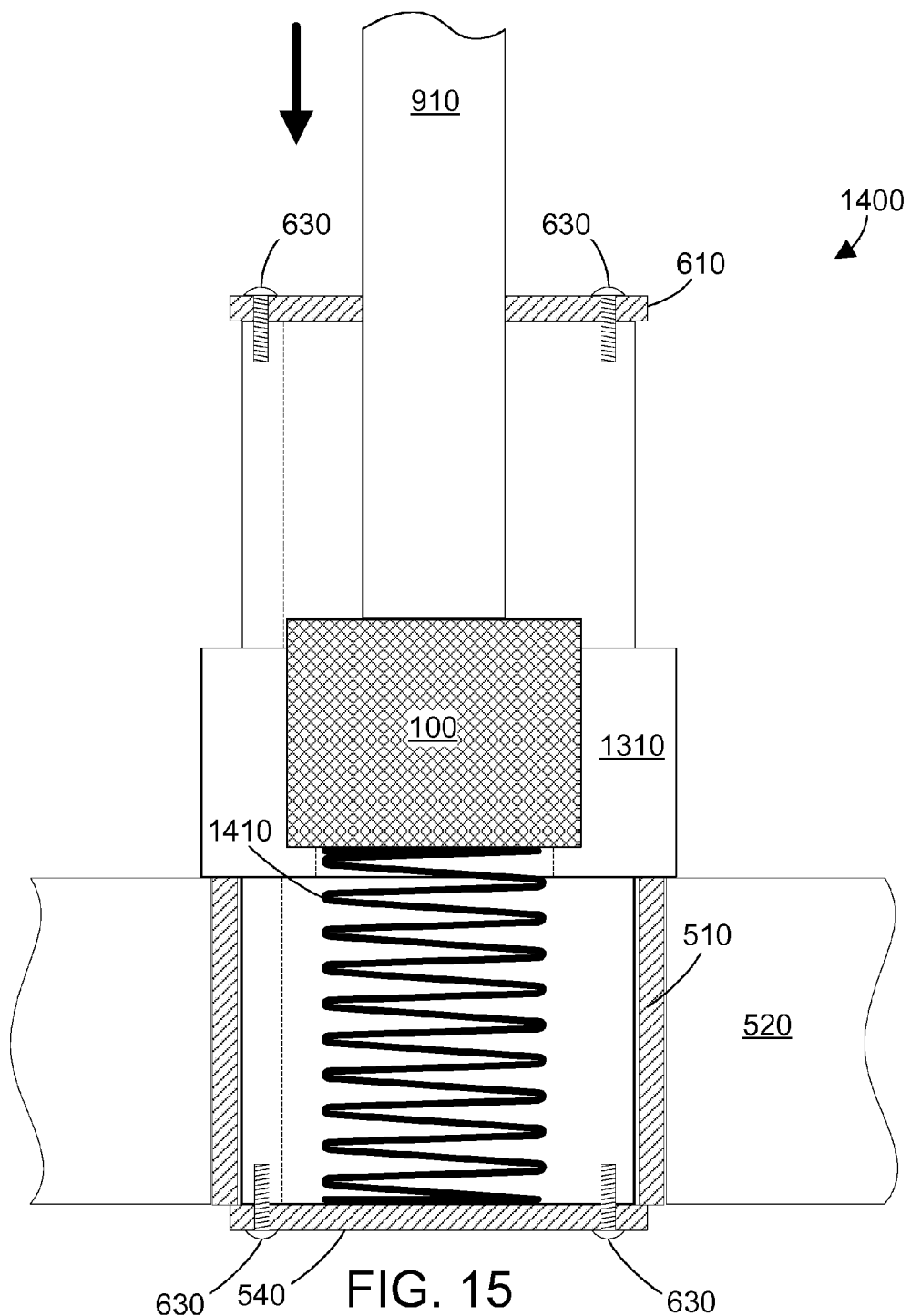
FIG. 15 is a cross-sectional view of the assembled third implementation of the filter turning mechanism illustrating how a ratchet extension can push the inner drive gear to engage the filter drive mechanism so that rotation of the ratchet extension causes rotation of the filter drive mechanism to turn a filter.

A third configuration for the filter turning mechanism is shown in FIGS. 13-15, and allows turning the filter mechanism from the same side as the filter. In this configuration, the filter drive mechanism 1310 includes an inner drive gear body 1350, a drive head 1340, and a flange body 1360. The inner drive gear body 1350 includes a spin chamber 1330, and the drive head 1340 includes an engage chamber 1320. The flange body 1360 is to mount the filter drive mechanism 1310 into a flange, as shown in FIGS. 14-15. In this configuration, the filter drive mechanism 1310 is placed within the bushing 510, and the bottom cap 540 is installed using screws 630. A spring 1410 is then placed through the top, followed by the inner drive gear 100. The top cap 610 is then attached using screws 630, resulting in an assembled filter turning mechanism 1400. The top cap 610 preferably has the configuration shown in FIG. 8 with a hole 810 through which a tool such as a ratchet extension may pass. Referring to FIG. 15, the assembled filter turning mechanism 1400 is used in the same way as the filter turning mechanism 1000 shown in FIG. 12. The ratchet extension 910 engages the inner drive gear 100, and is turned while pressing down until the inner drive gear slides within the engage chamber, thereby engaging the filter drive mechanism and causing the filter drive mechanism to turn as the ratchet extension is turned.

Figure 16:
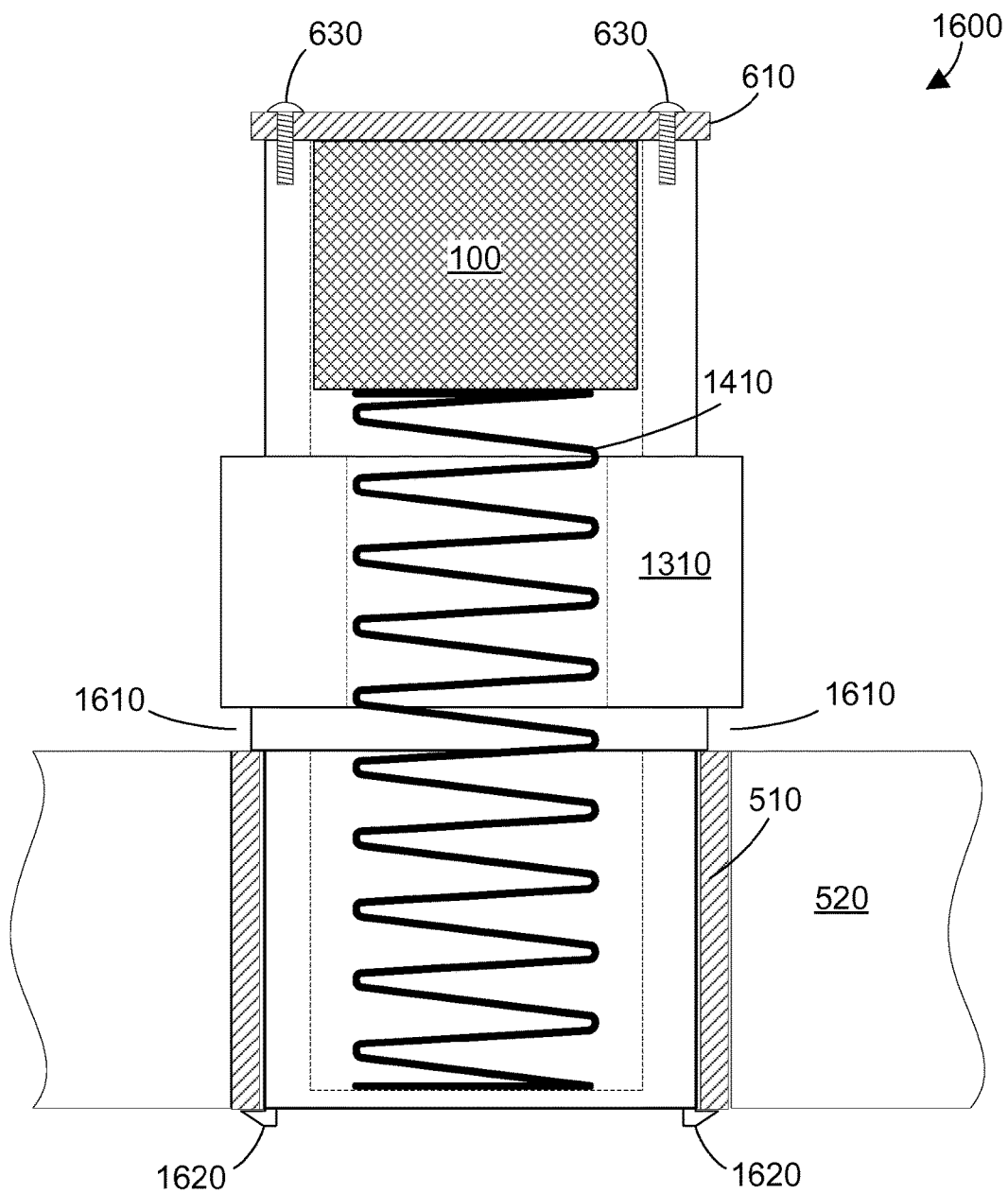
FIG. 16 is a cross-sectional view of a fourth implementation for the filter turning mechanism that allows using a tool from the top of the filter turning mechanism and includes features that could be incorporated into any of the implementations for the filter turning mechanism.

Variations are possible within the scope of the disclosure and claims herein. Two such variations are shown in FIG. 16. In the configuration shown in FIG. 16, there is a gap 1610 between the top surface of flange 520 and the drive head 1310. This gap allows accommodating filters that have rolled beads at the bottom that might otherwise interfere with the drive head 1310. Another variation is to include snap tabs 1620 on the bottom of the filter drive mechanism 1310 as shown. Using snap tabs 1620 allows the filter drive mechanism 1310 to be pushed into place within bushing 510, and once in place, the snap tabs 1620 snap out to engage the bushing 520, thereby securing the filter drive mechanism 1310 in place. Because no bottom cap is used, a bottom shelf or tab is needed to hold the spring 1410 in place, as shown in FIG. 16. Snap tabs 1620 are especially advantageous when the filter drive mechanism 1310 is installed in a flange 520 that has limited access to its back side, because the filter drive mechanism 1310 may be secured in place without using screws on the back side. Of course, many other variations are possible. For example, the head portion 1310 in FIG. 16 could include a partition between the drive head 1340 and flange body 1360 shown in FIG. 13, which would mean a much shorter spring could be used.

Note that any suitable drive tool could be used to engage the inner drive gear, which means any suitable opening in the inner drive gear may be used to accommodate a particular tool. For example, instead of a square opening 120 that extends from top to bottom of the inner drive gear 100 as shown in FIG. 1, a cross-shaped indention could be used instead that would accommodate a Phillips screwdriver head. Similarly, a hexagonal recess could be provided that would accommodate a hex key. The disclosure and claims herein expressly extend to any suitable tool for turning the filter turning mechanism, and any suitable recess or opening in the inner drive gear for receiving a tool to rotate the inner drive gear.

While the inner drive gear 100 is shown in FIG. 1 to include a plurality of gear teeth 110, and the interior of the filter drive mechanism 300 in FIG. 3 is shown to include a recess 350 that accommodates the plurality of gear teeth 110, a large number of geometrical configurations could be used. For example, the inner drive gear could have a hexagonal exterior, and the filter drive mechanism could have a hexagonal engage chamber. The disclosure and claims herein expressly extend to any suitable exterior configuration for the inner drive gear, and any suitable interior configuration for the engage chamber of the filter drive mechanism. As long as the inner drive gear can spin within engaging the filter drive mechanism in the spin chamber, and engages the filter drive mechanism in the engage chamber, any suitable geometrical configuration may be used, even if these do not match. For example, the exterior of the inner drive gear could be triangular while the interior of the engage chamber is hexagonal.

Figure 17:
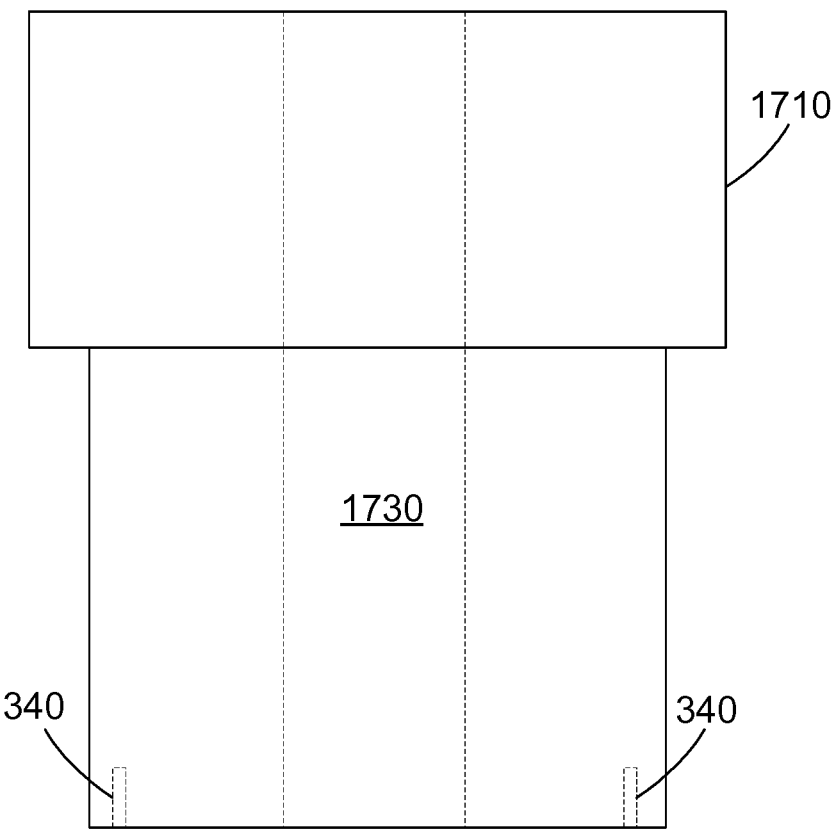
FIG. 17 is a cross-sectional view of a fifth implementation for the filter turning mechanism that allows using a tool from either the top or the bottom of the filter turning mechanism and that does not include an inner drive gear.
Figure 18:
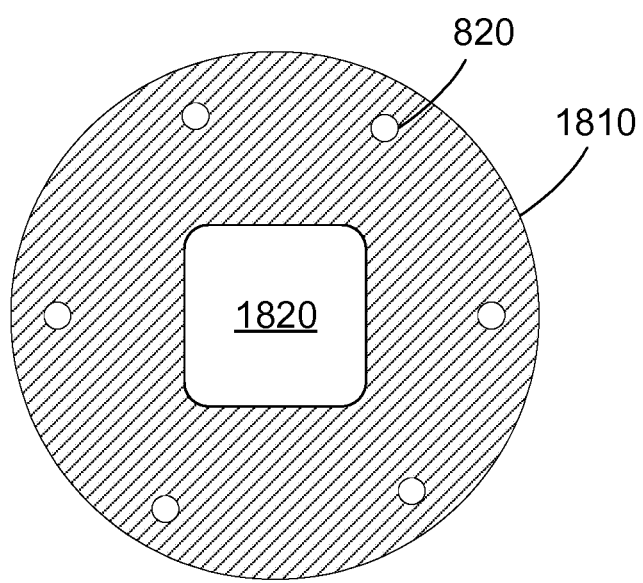
FIG. 18 is a top view of a bottom cap for the filter turning mechanism shown in FIG. 17.

A fourth implementation for the filter turning mechanism is shown in FIGS. 17-18. In this configuration, there is no inner drive gear. Instead, a substantially square hole 1730 runs from top to bottom of the filter drive mechanism 1710. The filter drive mechanism 1710 is installed in a flange the same was as shown in the previous three implementations, using a bottom plate and screws. While the bottom plate 810 shown in FIG. 8 could be used, another configuration of a suitable bottom plate 1810 is shown in FIG. 18 to include a substantially square hole 1820 that aligns with the substantially square hole 1730 in the filter drive mechanism 1710. One advantage of the configuration shown in FIGS. 17 and 18 is the filter drive mechanism 1710 may be turned from both the top and the bottom. The disclosure and claims herein expressly extend to any suitable filter drive mechanism that is rotatably coupled to a filter flange in proximity to a filter location on the filter flange such that when a filter is in the filter location, a head portion of the filter drive mechanism contacts an external portion of the filter to rotate the filter when the filter drive mechanism is rotated with a tool. Other possible configurations not expressly shown that are within the scope of the disclosure and claims herein extend to configurations with multiple gears that mesh to cause rotation of a tool to cause rotation of a filter drive mechanism.

Figure 19:
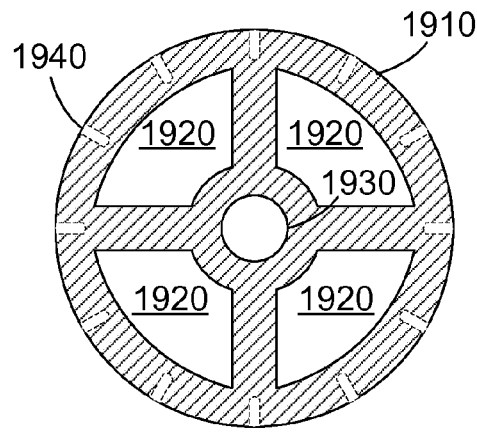
FIG. 19 is a top view of an adapter plate for existing engines.
Figure 22:
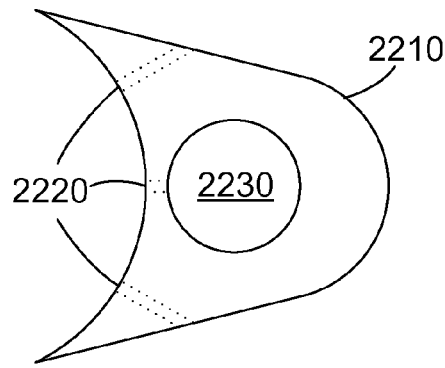
FIG. 22 is a top view of an adapter flange.
Figure 20:
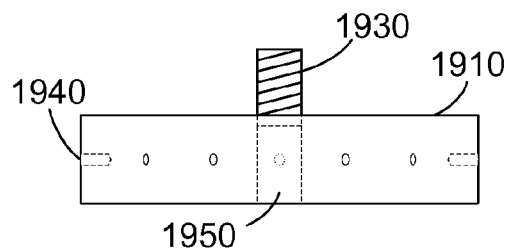
FIG. 20 is a side view of the adapter plate in FIG. 19.
Figure 23:
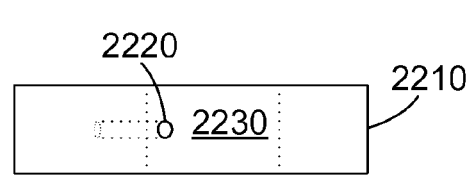
FIG. 23 is a side view of the adapter flange shown in FIG. 22.
Figure 21:
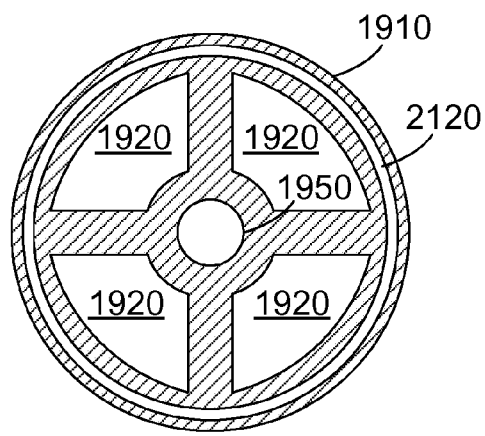
FIG. 21 is a bottom view of the adapter plate in FIGS. 19 and 20.

Most existing engines do not have a flange with a suitable hole in which a filter turning mechanism can be installed. As a result, a suitable retrofit has been developed. Referring to FIGS. 19-21, an adapter plate 1910 includes multiple openings 1920 and a threaded center mounting post 1930 that is configured to receive a filter. The adapter plate 1910 includes multiple holes 1940 and a threaded hole 1950 configured to thread on a threaded post in a filter location on an engine block. The adapter plate 1910 is turned onto the threaded post on the engine block where a filter is normally mounted. The filter plate includes a circular groove 2120 for receiving a suitable gasket, such as an 0-ring gasket. The adapter plate 1910 with gasket are screwed into place on the engine block where the filter normally goes. The adapter plate 1910 is then tightened to assure the gasket creates a good seal with no leaks. The threaded post 1930 preferably has the same configuration as the threaded post on the engine block, allowing an oil filter to be screwed to the adapter plate 1910 and tightened down. Once the adapter plate 1910 is in place, an adapter flange 2210 shown in FIGS. 22-23 may be connected to the adapter plate 1910. In the specific configuration shown in FIGS. 19-23, the adapter flange 2210 includes holes 2220 that may be aligned with three of the holes 1940 on the adapter plate. Because the holes 1940 on the adapter plate are along the entire circumference of the adapter plate 1910, and only three of these holes will be used to attach the adapter flange 2210, this provides great flexibility in determining a suitable location for the adapter flange 2220 around the circumference of the adapter plate 1910. Set screws could be used to attach the adapter flange 2210 to the adapter plate 1910 through holes 2220 and three of the holes 1940. The adapter flange 2210 includes a hole 2230 configured to receive a filter turning assembly such that the drive head of the filter turning assembly will contact the side of the filter when a filter is installed on the adapter plate 1910, thereby turning the filter when the filter turning assembly is turned with a tool.

In the most preferred implementation, a filter turning mechanism is installed in the hole 2230 in the adapter flange 2210 before the adapter flange 2210 is attached to the adapter plate 1910. An assembled flange adapter assembly thus includes an adapter flange 2210 with the installed filter turning mechanism attached to a filter adapter 2210. The disclosure and claims herein extend to a kit that may be used to retrofit an existing engine, where the kit includes an adapter plate, an adapter flange, and a filter turning mechanism. The kit may optionally include a filter for the vehicle that may include indentions or a textured surface to help the filter turning mechanism turn the filter.

Figure 24:
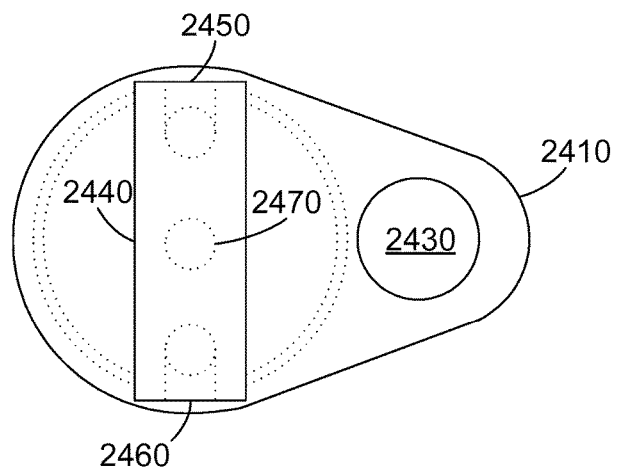
FIG. 24 is a bottom view of a hydraulic filter flange.
Figure 25:
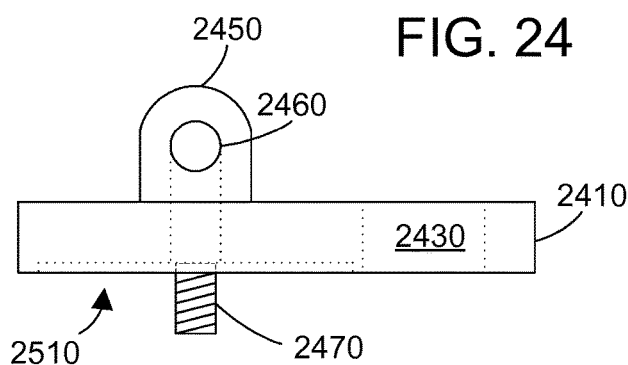
FIG. 25 is a side view of the hydraulic filter flange shown in FIG. 24.
Figure 26:
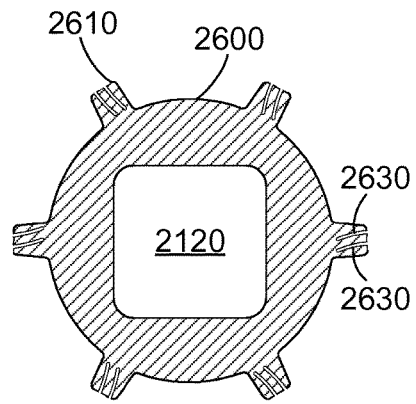
FIG. 26 is a top view of an alternative implementation for the inner drive gear shown in FIG. 1.

Some filters are not mounted to an engine block, but are instead mounted to a separate filter flange. An example configuration for a hydraulic filter flange 2410 is shown in FIGS. 24-25. The hydraulic filter flange 2410 includes a filter mounting post 2470, and a port housing 2450 on the opposite side that includes an inlet port 2450 and an outlet port 2460. The bottom side of the filter flange 2410 includes a filter location 2510 that includes the mounting post 2470 that defines where the filter will be when installed. The filter flange 2410 shown in FIGS. 24-25 includes a hole 2430 for receiving a filter turning mechanism as disclosed herein. Once installed, the drive head of the filter turning mechanism will contact the side of a filter when the filter is installed, allowing the filter turning mechanism to turn the filter. The disclosure and claims herein extend to any configuration for any suitable flange that receives a filter that is turned to install the filter or turned to remove the filter. Note the term "filter flange" herein does not necessarily imply a separate component, as the filter flange may be built into the engine block itself A variation for the inner drive gear is shown in FIG. 26. The inner drive gear 2600 is similar in shape to the inner drive gear shown in FIG. 1. Note, however, the inner drive gear 2600 includes one or more slits 2640 in each tooth 2610 of the inner drive gear. These slits allow the teeth of the drive gear to compress. With this configuration, the engage chamber of the filter drive mechanism may be configured to allow the inner drive gear 2600 to deform and spin within the filter drive mechanism when the torque on the inner drive gear exceeds some predetermined threshold. The slits 2630 thus form a torque relief mechanism that causes the inner drive gear to slip within the filter drive mechanism when torque on the inner drive gear exceeds the predetermined threshold. The torque relief mechanism in inner drive gear 2600 may thus be used to assure a filter is not torqued excessively when installing the filter. The torque relief mechanism in inner drive gear 2600 may also be used to assure that excessive torque on the inner drive does not gear break the teeth 2610 off the inner drive gear 2600. Note that other suitable torque relief mechanisms could also be used. For example, known torque ratchets include a click device that clicks once a desired torque is achieved. The disclosure herein expressly includes any suitable torque relief mechanism.

Figure 27:
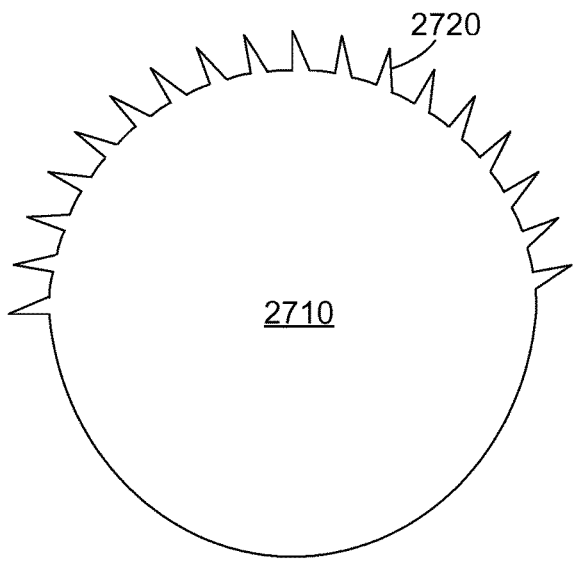
FIG. 27 is a top view of an alternative implementation for the filter drive mechanism shown in FIG. 3.

A variation for the drive head of the filter drive mechanism is shown in FIG. 27. In FIG. 27, the drive head 2710 of a filter drive mechanism includes a plurality of teeth 2720 only on half of the drive head. With this configuration, a filter may be turned by hand when the smooth part of the drive head contacts the filter, and may be turned by the filter drive mechanism 2710 a half turn or less when the teeth 2720 engage the filter. The configuration in FIG. 27 is especially useful for initially breaking loose a filter using the filter drive mechanism, then continuing turning the filter by hand to remove the filter.

Figure 28:
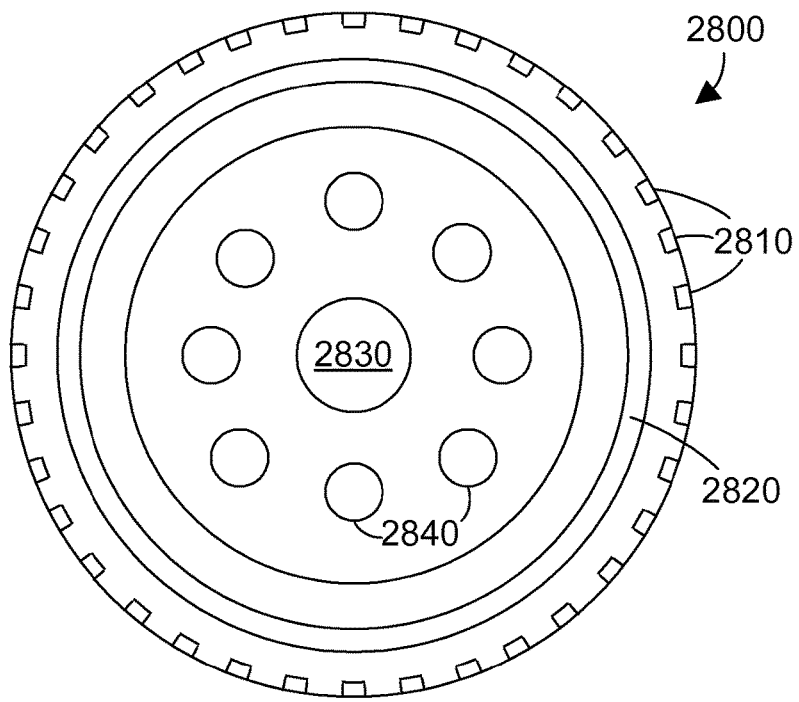
FIG. 28 is a bottom view of a filter.
Figure 29:
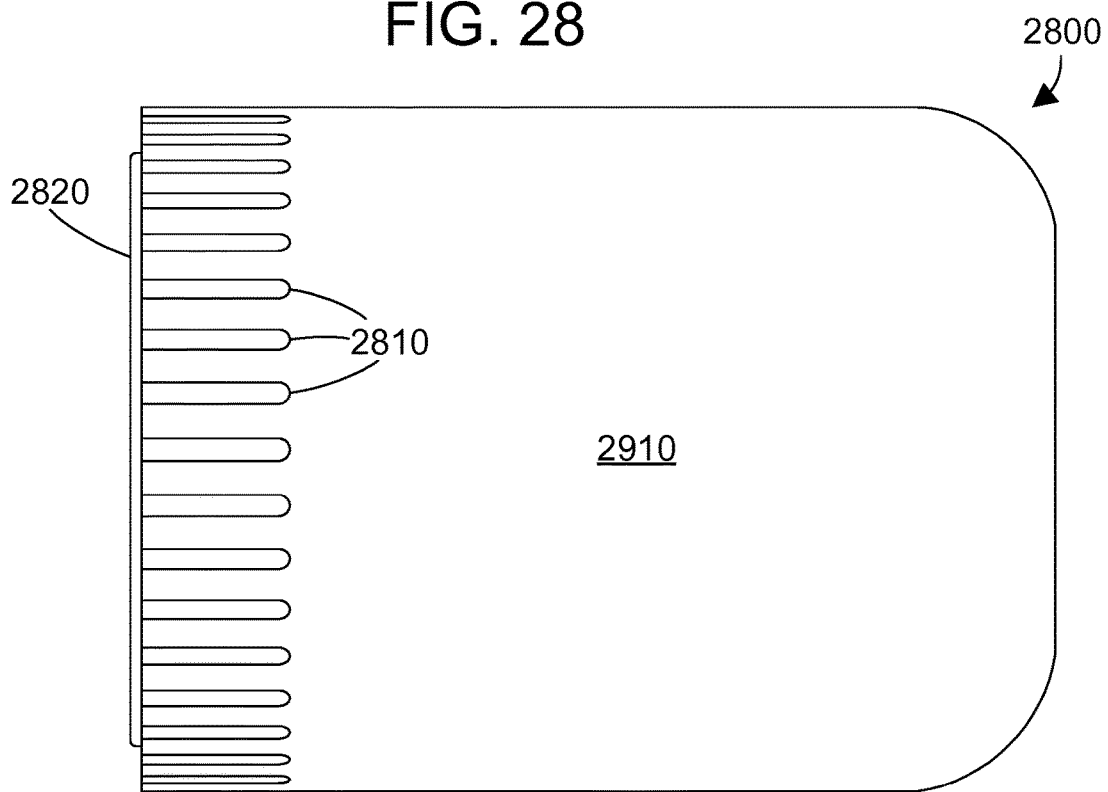
FIG. 29 is a side view of the filter shown in FIG. 28.

One suitable configuration for a filter is shown in FIGS. 28-29. Filter 2800 includes a body 2910 with indentions 2810 around its circumference near the filter gasket 2820. The filter includes in inlet port 2830 and multiple outlet ports 2840. The filter 2800 may be used in conjunction with the filter drive mechanism shown in FIG. 3 that includes teeth that engage the indentions 2810 in the filter to rotate the filter 2800.

Figure 30:
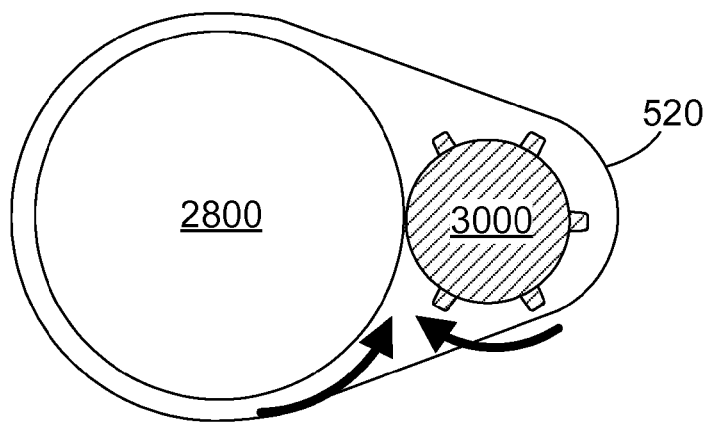
FIG. 30 is a top view showing a filter turning mechanism with gear teeth turning a filter;\
Figure 31:
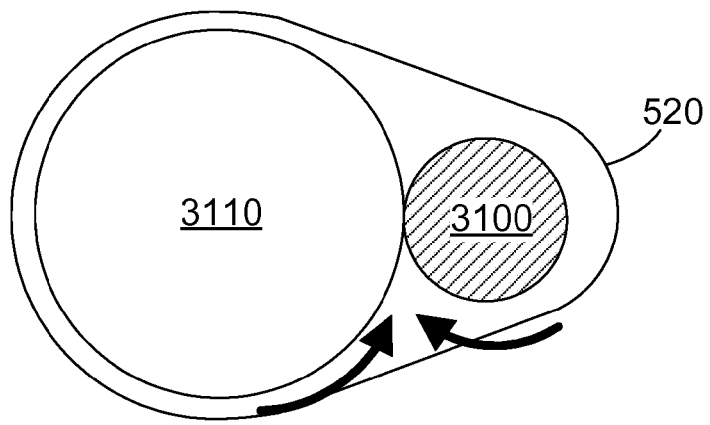
FIG. 31 is a top view showing a filter turning mechanism with a textured roller turning a filter.
Figure 32:
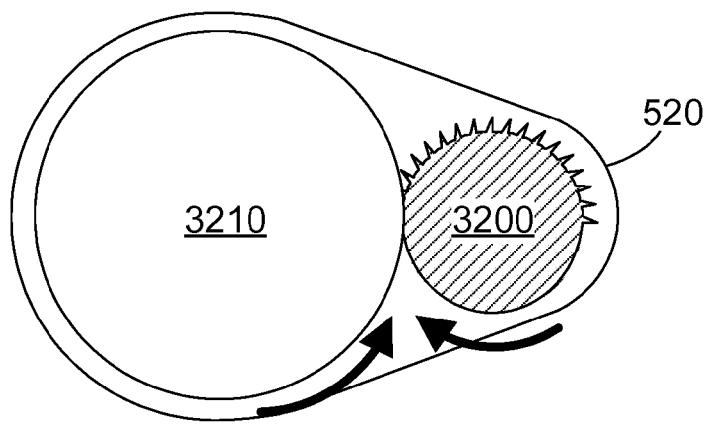
FIG. 32 is a top view showing a filter turning mechanism with a roller that has teeth on only half of its roller surface turning a filter.

Three specific configurations of for the filter turning mechanism and corresponding filters are shown in FIGS. 30-32. A first configuration 3000 in FIG. 30 includes gear teeth similar to those shown in FIG. 3 that engage corresponding indentions such as 2810 shown in FIGS. 28 and 29. A second configuration 3100 in FIG. 31 includes a textured roller on the drive head of the filter turning assembly, with a corresponding textured surface on the filter 3110. For example, the drive head of the filter turning assembly 3100 may include a knurled surface, and the filter 3110 could include a strip of textured material such as sandpaper or rubber that allows the knurled surface of the drive head to rotate the filter 3110. A third configuration 3200 shown in FIG. 32 includes a drive head similar to the drive head 2710 shown in FIG. 27 that includes teeth on half of its circumference. The filter 3210 could include a corresponding surface that mates with the teeth on the drive head, could include a textured surface that allows the teeth on the drive head to better grip the filter, or the drive head could simply engage the metal surface of the filter. As explained above with reference to FIG. 27, having teeth on only half of the drive head allows the filter to be turned by hand when the smooth half of the drive head contacts the filter, and allows the filter to be turned for up to a half turn using the filter turning mechanism 3200, such as when loosening the filter.

Figure 33:
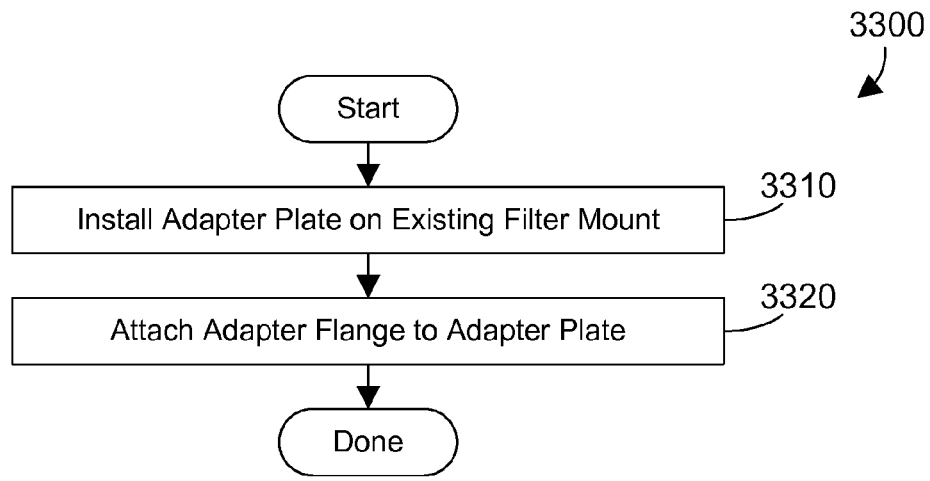
FIG. 33 is a flow diagram of a method for retrofitting an existing engine to use the filter turning mechanism.

Referring to FIG. 33, a method 3300 allows retrofitting an existing engine to use the filter turning mechanisms disclosed herein. An adapter plate is installed on the existing filter mount of the engine (step 3310). Adapter plate 1910 in FIGS. 19-21 is a suitable example of an adapter plate that could be used, but other configurations of adapter plates are also within the scope of the disclosure and claims herein. An adapter flange is then attached to the adapter plate (step 3320). Method 3300 is then done. In the most preferred implementation, the adapter flange installed in step 3320 will already have the filter turning mechanism installed in the hole of adapter flange. The result of performing method 3300 is an adapter flange assembly. Method 3300 illustrates the simple steps in retrofitting an existing engine to use the filter turning mechanisms disclosed herein.

Figure 34:
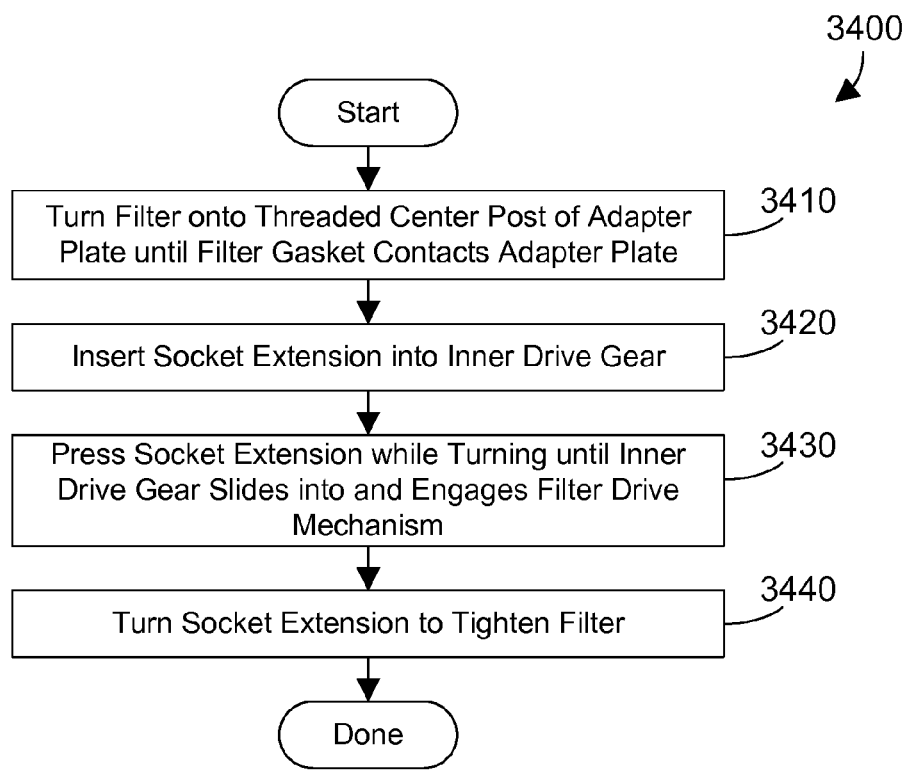
FIG. 34 is a flow diagram of a method for installing a filter using the filter turning mechanism.

Referring to FIG. 34, a method 3400 shows how to use the filter turning mechanism to install a filter. The filter is turned onto the threaded center post of the adapter plate until the filter gasket contacts the adapter plate (step 3410). This may be done by hand, and the process of turning the filter by hand may cause the filter turning mechanism to spin once the filter contacts the filter turning mechanism. A socket extension is then inserted into the inner drive gear in the filter turning mechanism (step 3420). The socket extension is then pressed while turning until the inner drive gear slides into and engages the filter drive mechanism (step 3430). At this point turning the inner drive gear results in turning the filter drive mechanism, which turns the filter. The inner drive gear is thus turned by the socket extension to tighten the filter (step 3440). Method 3400 is then done.

Figure 35:
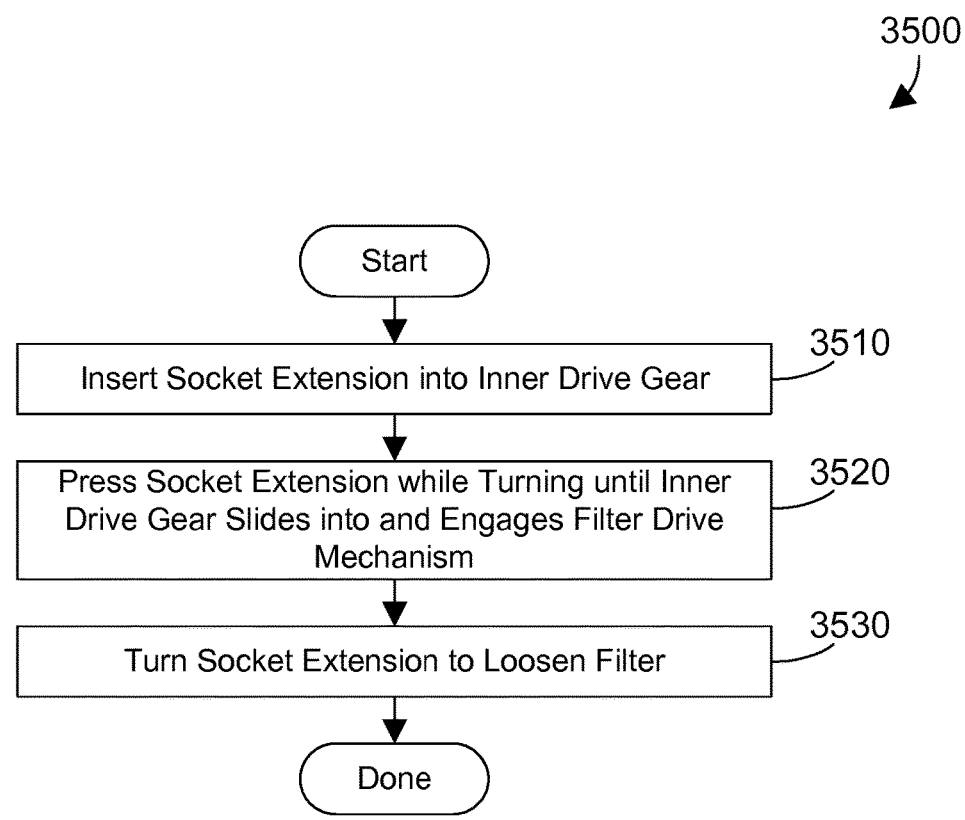
FIG. 35 is a flow diagram of a method for removing a filter using the filter turning mechanism.

A method 3500 shown in FIG. 35 shows how to use the filter turning mechanism to remove a filter. A socket extension is inserted into the inner drive gear (step 3510). The socket extension is pressed while turning until the inner drive gear aligns with recesses in the filter drive mechanism and the force of pressing the socket extension overcomes the bias of the spring so the inner drive gear slides into and engages the filter drive mechanism (step 3520). At this point turning the inner drive gear results in turning the filter drive mechanism, which turns the filter. The inner drive gear is thus turned by the socket extension to loosen the filter (step 3530). Method 3500 is then done.

The filter turning mechanism and its components may be made of any suitable material. Preferred materials include metal and plastic. High-strength plastic that can withstand the operating temperatures of an internal combustion engine are preferred due to their relatively low cost and the ease of molding complicated parts such as the filter drive mechanism. Of course, any other suitable material, such as carbon composites and other materials, could also be used.

The examples herein illustrate filters that screw onto a threaded post. Note, however, the filter turning mechanisms disclosed herein may be used with any filter that includes threads such that the filter is put on and taken off by turning the filter. For example, a filter flange could include internal threads, and the exterior of the filter housing could include external threads that engage the internal threads of the filter flange. The disclosure and claims herein expressly extend to turning any filter that is installed and removed by turning.

One of the advantages of the filter turning mechanism disclosed and claimed herein is the reduced exposure to chemicals while changing a filter. With known tools and methods for changing a filter, it is common for a mechanic to get oil, hydraulic fluid, or other chemicals on his or her hands. With the filter turning mechanisms disclosed herein, a mechanic can put a long ratchet extension into the filter turning mechanism, and turn the filter until it falls into a catch pan, thereby reducing the likelihood of the mechanic getting chemicals and fluids on the hands while changing a filter.

The disclosure herein relates to a filter turning mechanism that is attached to an engine in proximity to a filter (such as an oil filter), and may be used to install or remove a filter by turning the filter. The filter turning mechanism contacts a filter, and rotates the filter when the filter turning mechanism is rotated with a tool. One implementation of the filter turning mechanism includes an inner drive gear and a filter drive mechanism. The inner drive gear normally spins freely within the filter drive mechanism, but when pushed into the filter drive mechanism with a suitable tool such as a ratchet extension, the inner drive gear engages the filter drive mechanism, thereby causing rotation of the inner drive gear to rotate the filter drive mechanism as well, which in turn rotates the filter.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
a filter drive mechanism rotatably coupled to a filter flange that is in a fixed position with respect to a filter location, wherein the filter drive mechanism is in a fixed position adjacent the filter location, such that when a filter is in the filter location a head portion of the filter drive mechanism contacts an external portion of the filter to rotate the filter when the head portion of the filter drive mechanism is rotated with a tool.

2. The apparatus of claim 1 wherein the head portion comprises a plurality of teeth that contact the filter.

3. The apparatus of claim 2 wherein the filter comprises a plurality of indentions that receive the plurality of teeth as the filter drive mechanism is rotated.

4. The apparatus of claim 1 wherein the head portion comprises a textured roller and the filter comprises a textured surface that contacts the textured roller.

5. The apparatus of claim 1 further comprising an inner drive gear disposed within the filter drive mechanism, the filter drive mechanism defining a spin chamber where the inner drive gear may spin without engaging an outer portion of the filter drive mechanism that includes the head portion, the filter drive mechanism further defining an engage chamber where the inner drive gear engages the outer portion of the filter drive mechanism, wherein the apparatus further comprises a spring within the filter drive mechanism that provides a bias force that pushes the inner drive gear in the spin chamber.

6. The apparatus of claim 5 wherein the inner drive gear comprises a torque relief mechanism that causes the inner drive gear to slip within the filter drive mechanism when torque on the inner drive gear exceeds a predetermined threshold.

7. The apparatus of claim 5 wherein the bias force of the spring is overcome by a tool passing through an opening in the filter drive mechanism to engage the inner drive gear and pushing the inner drive gear against the bias force of the spring until the inner drive gear at least partially enters the engage chamber to engage the outer portion of the filter drive mechanism such that turning the inner drive gear with the tool results in turning the head portion of the filter drive mechanism.

8. An apparatus comprising:
a filter drive mechanism rotatably coupled to a filter flange that is in a fixed position with respect to a filter location, wherein the filter drive mechanism is in a fixed position adjacent the filter location, such that when a filter is in the filter location a head portion of the filter drive mechanism contacts an external portion of the filter to rotate the filter when the filter drive mechanism is rotated with a tool, wherein the head portion comprises a plurality of teeth that contact the filter, wherein the filter comprises a plurality of indentions that receive the plurality of teeth as the filter drive mechanism is rotated, wherein the filter drive mechanism comprises an inner drive gear disposed within the filter drive mechanism, the filter drive mechanism defining a spin chamber where the inner drive gear may spin without engaging the filter drive mechanism, the filter drive mechanism further defining an engage chamber where the inner drive gear engages the filter drive mechanism, wherein the apparatus further comprises a spring within the filter drive mechanism that provides a bias force that pushes the inner drive gear in the spin chamber.

9. The apparatus of claim 8 wherein the inner drive gear comprises a torque relief mechanism that causes the inner drive gear to slip within the filter drive mechanism when torque on the inner drive gear exceeds a predetermined threshold.

10. The apparatus of claim 8 wherein the bias force of the spring is overcome by a tool engaging the inner drive gear and pushing the inner drive gear against the bias force of the spring until the drive gear at least partially enters the engage chamber to engage the filter drive mechanism such that turning the inner drive gear with the tool results in turning the filter drive mechanism.

11. An apparatus comprising:
a filter drive mechanism rotatably coupled to a filter flange that is in a fixed position with respect to a filter location, wherein the filter drive mechanism is in a fixed position adjacent the filter location, such that when a filter is in the filter location a head portion of the filter drive mechanism contacts an external portion of the filter to rotate the filter when the filter drive mechanism is rotated with a tool, wherein the head portion comprises a textured roller and the filter comprises a textured surface that contacts the textured roller, wherein the filter drive mechanism comprises an inner drive gear disposed within the filter drive mechanism, the filter drive mechanism defining a spin chamber where the inner drive gear may spin without engaging the filter drive mechanism, the filter drive mechanism further defining an engage chamber where the inner drive gear engages the filter drive mechanism, wherein the apparatus further comprises a spring within the filter drive mechanism that provides a bias force that pushes the inner drive gear in the spin chamber.

12. The apparatus of claim 11 wherein the inner drive gear comprises a torque relief mechanism that causes the inner drive gear to slip within the filter drive mechanism when torque on the inner drive gear exceeds a predetermined threshold.

13. The apparatus of claim 11 wherein the bias force of the spring is overcome by a tool engaging the inner drive gear and pushing the inner drive gear against the bias force of the spring until the drive gear at least partially enters the engage chamber to engage the filter drive mechanism such that turning the inner drive gear with the tool results in turning the filter drive mechanism.

* * * * *